E. S. CHARLES.
LEVER MECHANISM FOR CLUTCHES.
APPLICATION FILED JULY 10, 1915.

1,373,410.

Patented Apr. 5, 1921.

Inventor
Edward S. Charles,
By Chas. E. Lord
Atty.

UNITED STATES PATENT OFFICE.

EDWARD SANFORD CHARLES, OF CHICAGO, ILLINOIS, ASSIGNOR, BY MESNE ASSIGNMENTS, TO INTERNATIONAL HARVESTER COMPANY, A CORPORATION OF NEW JERSEY.

LEVER MECHANISM FOR CLUTCHES.

1,373,410.  Specification of Letters Patent.  Patented Apr. 5, 1921.

Application filed July 10, 1915. Serial No. 39,140.

*To all whom it may concern:*

Be it known that I, EDWARD S. CHARLES, a citizen of the United States, residing at Chicago, in the county of Cook and State of Illinois, have invented certain new and useful Improvements in Lever Mechanism for Clutches, of which the following is a full, clear, and exact specification.

My invention relates to lever mechanism for ensilage cutters or the like.

It has for its object to improve and simplify the construction of safety controlling mechanisms for such machines whereby, while the controlling member is definitely held in each position of adjustment against accidental displacement, the same may be operated with increased facility, may be manufactured at reduced expense, and may be rendered more compact in construction, at the same time the wear upon the parts being reduced. I attain these objects by an improved construction of clutch controlling mechanism whereby the clutch mechanism of the machine may be controlled, the said controlling mechanism including an automatically acting spring-pressed reciprocating member, preferably in the form of a roller, carried upon the controlling lever and automatically projected or retracted as the latter is operated, and coöperating with a notched member on the frame of the machine in holding the clutch mechanism against accidental movement from its various positions, all as hereinafter more specifically set forth.

In the accompanying drawings I have, for purposes of illustration, shown one embodiment which my invention may assume in practice.

Figure 1:
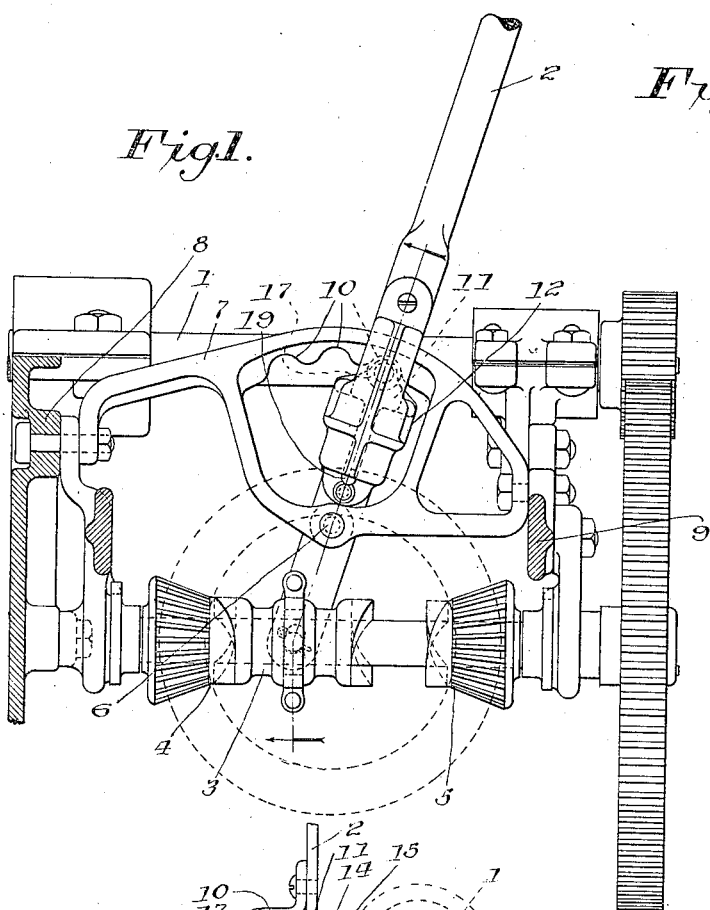
Figure 1 is a partial side elevation of the controlling mechanism of an ensilage cutter equipped with my improvement.
Figure 2:
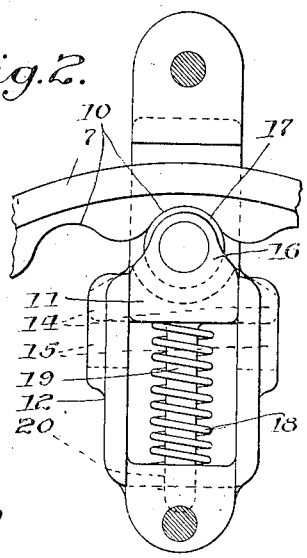
Fig. 2 is a detail view of the spring-pressed roller or plunger and its coöperating member.
Figure 4:
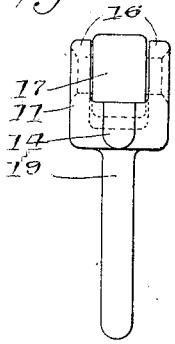
Fig. 4 is a detail view of the plunger removed from its coöperating mechanism.
Figure 3:
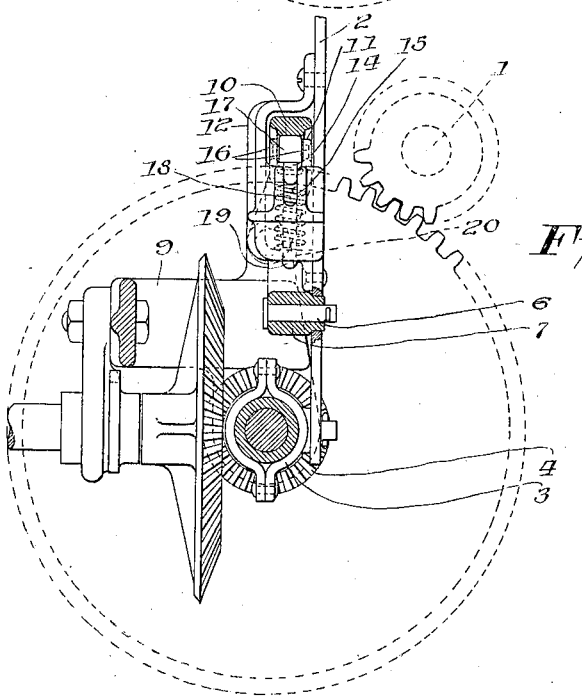
Fig. 3 is a detail view, partially in section, taken approximately on line indicated by the arrows in Fig. 1.
Figure 5:
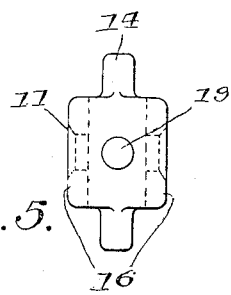
Fig. 5 is a top plan view of the plunger shown in Fig. 4.

In these drawings I have shown my improved mechanism as applied to an ensilage cutter controller of the Merwin type, whereby in the connection of the power from the cutter shaft 1 is controlled by a U-shaped controlling member or lever 2 which extends over the feeding conveyer and is connected at one of its ends to a clutch shipper 3 which connects or disconnects coöperating clutch members 4 and 5.

In my improvement the controlling member or lever 2 is pivotally mounted at 6 upon a bracket or casting 7 which bridges the interval between two of the transverse frame members 8 and 9. This bracket is provided at a point intermediate its ends with a concave notched surface, which surface is disposed in an arc about the pivot 6 of the controlling member as a center. As shown, three notches 10 are preferably provided in this surface to correspond with the forward, reverse and neutral positions of the clutch shipper 3, and these three notches are each preferably provided with rounded bottoms and separated by rounded peaks. Coöperating with the notches 10 is a member 11 reciprocable in a guide 12 carried near the pivot of the controlling member. This member 11 is provided with extensions 14 at its sides movable longitudinally of the member 2 and toward or from the notches 10 within the limits of slots 15 formed in the guide 12. As shown, this reciprocating member 11 is also preferably provided at its upper end with spaced upstanding lugs 16 in which is journaled a roller 17 adapted to engage successively with the notches 10 and roll longitudinally of the notched member when the controlling member 2 is moved about its pivot in either direction. Holding this roller, normally in its projected or notch engaging position, is a spring 18 coiled about an elongated, vertically disposed shank 19 which is movable through a suitable recess 20 in the bottom of the guide 12.

In the operation of this mechanism it is obvious that, with the roller 17 in engagement with any notch 10 in the stationary notched member, whether that corresponding to the forward, the reverse, or the neutral position of the shipper 3, when the controlling member 2 is moved about its pivot, the reciprocating member or plunger 11 will be obliged to recede automatically from its position to the notch it then occupies, due to the pressure of the roller 17 against the side of the adjacent peak. This will compress the spring 18, which, as soon as the roller 17 has passed over the peak, due to the continued movement of the controlling member 2, will again project the reciprocating member or plunger 11 upward and cause the roller 17 thereon to be seated in the next notch.

In this construction the controlling member 2 is securely held in either the forward, reverse or neutral positions of the clutch mechanism in such a manner that the same may not be moved or shifted accidentally either by the operator or by the vibration of the machine, the spring 18 in each position holding the roller 17 definitely seated in the notch corresponding to the position then occupied by the clutch shipper 3. It will also be noted that, due to this construction, the controlling member 2 may be very readily moved about its pivot in either direction with a minimum of effort on the part of the operator, and that there is little or no wear between the surfaces, the roller 17 passing freely over the rounded surfaces of the notches 10 and the peaks between them.

While I have in this application described one embodiment which my invention may assume in practice, it is, of course, to be understood that the form shown herein is used for purposes of illustration and may be modified without departing from the spirit of the invention.

What I claim as new is:

1. In a control mechanism, the combination of a member having rounded notched portions, a pivotally mounted control lever associated therewith and movable in a single plane, a guide member secured to said lever and having slots therein, and a spring-pressed member slidably mounted in said guide member having a roller in one end thereof to engage the rounded notches and having lateral extensions movable within the slots in the guide member.

2. In a control mechanism, the combination of a curved bracket having a concave notched portion, a pivoted control member associated with the bracket and movable in a single plane, a guide member carried by the control member and embracing the bracket, oppositely disposed guide slots in the guide member, a spring pressed reciprocable member mounted in the guide member for yieldingly engaging the notched portion of the bracket and having lateral extensions guided by said slots.

In testimony whereof I affix my signature.

EDWARD SANFORD CHARLES.